(12) United States Patent
Thetford

(10) Patent No.: US 8,859,677 B2
(45) Date of Patent: Oct. 14, 2014

(54) DISPERSANTS

(75) Inventor: Dean Thetford, Rochdale (GB)

(73) Assignee: Lubrizol Limited (GB)

(*) Notice: Subject to any disclaimer, the term of this patent is extended or adjusted under 35 U.S.C. 154(b) by 651 days.

(21) Appl. No.: 11/719,970

(22) PCT Filed: Dec. 6, 2005

(86) PCT No.: PCT/US2005/043923
§ 371 (c)(1),
(2), (4) Date: May 23, 2007

(87) PCT Pub. No.: WO2006/071460
PCT Pub. Date: Jul. 6, 2006

(65) Prior Publication Data
US 2008/0103234 A1    May 1, 2008

Related U.S. Application Data

(60) Provisional application No. 60/638,634, filed on Dec. 23, 2004.

(51) Int. Cl.
| | | |
|---|---|---|
| C09B 67/02 | (2006.01) |
| C09D 7/02 | (2006.01) |
| C09D 11/03 | (2014.01) |
| C09D 11/16 | (2014.01) |
| C09D 11/18 | (2006.01) |
| C09D 11/326 | (2014.01) |
| C08G 69/26 | (2006.01) |
| C08G 69/28 | (2006.01) |
| C08L 79/00 | (2006.01) |
| B01F 17/00 | (2006.01) |
| C09B 67/04 | (2006.01) |
| C09B 67/46 | (2006.01) |

(52) U.S. Cl.
CPC .............. *B01F 17/005* (2013.01); *C09D 11/16* (2013.01); *C09D 11/03* (2013.01); *C09D 7/02* (2013.01); *C09B 67/0002* (2013.01); *C09D 11/326* (2013.01); *C09D 11/18* (2013.01); *C09B 67/009* (2013.01)
USPC ................ 524/606; 524/607; 524/1; 528/363

(58) Field of Classification Search
CPC ........ C09B 67/02; C09B 6/009; C09D 11/16; C09D 11/18; C09D 11/03; C09D 11/326; C09D 7/02; C08G 69/26; C08G 69/28; C08L 77/00; C08L 79/00; B01F 17/005
USPC .............................. 524/1, 606, 607; 528/363
See application file for complete search history.

(56) References Cited

U.S. PATENT DOCUMENTS

| | | | | |
|---|---|---|---|---|
| 4,224,212 A | * | 9/1980 | Topham ........................ 524/190 |
| 5,700,395 A | * | 12/1997 | Thetford et al. ................ 516/31 |
| 6,197,877 B1 | * | 3/2001 | Thetford et al. ............... 524/599 |

FOREIGN PATENT DOCUMENTS

| | | |
|---|---|---|
| WO | 94/21368 A1 | 9/1994 |
| WO | 98/19784 A1 | 5/1998 |
| WO | 00/24503 A1 | 5/2000 |
| WO | 01/80987 A2 | 11/2001 |
| WO | 2005/010109 A2 | 2/2005 |

* cited by examiner

*Primary Examiner* — Kriellion Sanders
(74) *Attorney, Agent, or Firm* — Samuel B. Laferty

(57) ABSTRACT

The present invention provides a dispersant of formula (1): T-V-(A)n, -U-Z-W, Formula (1) wherein, T is a polymerization terminating group; V is a direct bond or divalent linking group; A is the residue of one or more different hydroxy carboxylic acids or lactones thereof, U is a direct bond or a divalent linkage; Z is the residue of a polyamine or polyimine; W is the residue of an oxide or urea; m is from 2 to 2000; and x is from 1 up to the maximum number of available amino and/or imino groups in Z which do not carry the group T-V-(A)$_n$, -U-.

14 Claims, No Drawings

DISPERSANTS

CROSS REFERENCE TO RELATED APPLICATION

This application is filed pursuant to Provisional Application No. 60/638,634 filed on Dec. 23, 2004.

FIELD OF INVENTION

The present invention relates to dispersants for dispersing a particulate solid in an organic medium and to millbases, paints and inks, including inks for ink jet printing.

BACKGROUND OF THE INVENTION

There are numerous publications in the patent literature which disclose polyester amine dispersants derived from a poly($C_{2-4}$-alkylene imine) (hereinafter PAI) such as polyethylene imine (hereinafter PEI) to which is attached a polyester chain. The polyester chain may be derived from 12-hydroxy stearic acid as disclosed in U.S. Pat. No. 4,224,212 or it may be derived from two or more different hydroxy carboxylic acids or lactones thereof as disclosed in U.S. Pat. No. 5,700,395 and U.S. Pat. No. 6,197,877. It has now been found that still further improvements may be made whereby any amino and/or imino groups in the polyalkylene imine are reacted with either oxygen or urea. Improvements include at least one of superior fluidity of pigment dispersions; use in acid catalysed, epoxy and isocyanate coating processes; and resistant to discoloration when exposed to UV light.

SUMMARY OF THE INVENTION

Thus, according to the invention, there is provided a dispersant of formula (1):

$$T\text{-}V\text{-}(A)_m\text{-}U\text{-}Z\text{-}W_x \qquad \text{Formula (1)}$$

wherein

T is a polymerisation terminating group;
V is a direct bond or divalent linking group;
A is the residue of one or more different hydroxy carboxylic acids or lactone thereof;
U is a direct bond or a divalent linking group;
Z is the residue of a polyamine or polyimine;
W is the residue of an oxide or urea;
m is from 2 to 2000; and
x is from 1 up to the maximum number of available amino and/or imino groups in Z (unsubstituted valences of Z) which do not carry the group T-V-$(A)_m$-U-.

DETAILED DESCRIPTION OF THE INVENTION

The present invention provides a composition as described above.

In one embodiment, there are at least two groups T-V-$(A)_m$- attached to Z and these may be the same or different.

When V is a divalent linking group and in one embodiment —CO—.

When T is a polymerisation terminating group, it includes the residue of a carboxylic acid R—COOH or an alcohol R—OH and where R is $C_{1-50}$-hydrocarbyl which is optionally substituted.

In one embodiment, R contains not greater than 40, or not greater than 30 or not greater than 20 carbon atoms.

R may be aryl, aralkyl, heteroaryl, cycloalkyl or an alk(en)yl which may be linear or branched. In one embodiment, R is alkyl.

When R is aryl, it includes phenyl or naphthyl which is optionally substituted by $C_{1-20}$-alkyl, $C_{1-20}$-alkoxy, halogen, nitrile or phenoxy. Specific examples of R—COOH are benzoic acid or naphthalene-2-carboxylic acid. Specific examples of R—OH are phenol, 2-naphthol, 4-octylphenol and 4-nonylphenol.

When R is aralkyl, it includes phenylacetic acid, naphthoxyacetic acid, benzyl alcohol or 2-hydroxyethylphenyl.

When R is hetero-aryl, it may be thienyl.

When R is cycloalkyl, it includes $C_{3-8}$-cycloalkyl with suitable examples being cyclopropyl or cyclohexyl which is optionally substituted by one or more $C_{1-6}$-alkyl groups.

As noted hereinbefore, R is optionally substituted alkyl, for instance, an alkyl containing one or more ether groups. Suitable examples of R—COOH are methoxyacetic acid, propionic acid, butyric acid, hexanoic acid, octanoic acid, lauric acid, dodecanoic acid, stearic acid, 2-ethylbutyric acid, 2-ethylhexanoic acid, 2-butyloctanoic acid, 2-hexyldecanoic acid, 2-octyldodecanoic acid and 2-decyltetradecanoic acid. Branched alkyl carboxylic acids of this type are available under the trade mark Isocarb (ex Condea GmbH) and specific examples are Isocarb 12, 16, 20, 28, 32, 34T and 36. Many of the carboxylic acids are available commercially as mixtures.

When R is substituted, it may contain one or more ether groups in R—COOH or at least two ether groups. The ether groups may constitute a poly $C_{1-4}$-alkyleneoxide chain containing propoxy, ethoxy or butoxy groups including mixtures thereof. In one embodiment, mixtures include propoxy/ethoxy polyether chains. Where the polyether chain contains more than one different alkylene oxide unit, it is common that the amount of ethylene oxide is not less than 50%, not less than 70% or not less than 90% by weight of the polyether chains. In one embodiment, the polyether chain is composed entirely of ethylene oxide units.

When R—COOH contains a polyether chain, it includes a polyalkyleneoxy mono $C_{1-24}$-alkyl ether. The weight average molecular weight of the polyethyleneoxy mono alkyl ether in one embodiment is not greater than 2000, not greater than 1000 or not greater than 600. Mono alkyl ether carboxylic acids of formula $R^1$—O—$(CH_2CH_2O)_q CH_2$ COOH are available under the trade name Akypo of Kao Chemicals GmbH. Specific examples are Akypo LF1 ($R^1$ is $C_8$, q=5), Akypo LF2 ($R^1$ is $C_8$, q=8), Akypo RLM 25 ($R^1$ is $C_{12}/C_{14}$, q=2.5), Akypo RLM 45 CA ($R^1$ is $C_{12}/C_{14}$, q=4.5), Akypo RO 20 VG ($R^1$ is $C_{16}/C_{18}$, q=2) and Akypo RO 50 VG ($R^1$ is $C_{16}/C_{18}$, q=5).

Examples of R—OH are methanol, ethanol, n-butanol, n-hexanol, n-octanol, n-decanol, n-dodecanol, n-tetradecanol, n-hexadecanol, n-octadecanol, oleyl alcohol, isopropanol, isobutanol, tertbutanol, 2-ethylbutanol, 3-heptanol, 2-ethylhexanol, 3,5,5-trimethylhexanol, 3,7-dimethyloctanol and the so-called Guerbet alcohols such as those which are commercially available under the trade name Isofol (ex Condea GmbH) including mixtures thereof. Specific examples of Guerbet alcohols are Isofol 12, 14T, 16, 18T, 18E, 20, 24, 28, 32, 32T and 36.

In one embodiment, R in R—OH is a substituted alkyl group and it contains one or more ether groups and in another embodiment not less than two ether groups. The ether groups may constitute a poly $C_{1-4}$-alkylene oxy chain containing propoxy, ethylene oxy or butylene oxy repeat units including mixtures thereof. Where the polyether chain contains more than one different alkylene oxy repeat unit, ethylene oxy units may be present in one embodiment on not less than 50%, in another embodiment not less than 70% and in another embodiment not less than 90% by weight of the polyether chain. In one embodiment, the polyether chain contains solely ethylene-oxy units. In one embodiment, alcohols of this type are polyethylene oxy mono $C_{1-24}$-alkyl ethers, such as a $C_{1-12}$-mono alkyl ethers or $C_{1-6}$-mono alkyl ethers. Typically, monomethyl ethers are employed due to their availability. The weight average molecular weight of the polyalkylene oxy mono alkyl ether in one embodiment is not greater than 2000 and in another embodiment not greater than 1000. Specific examples of polyethylene oxy mono methyl ethers have weight average molecular weights of 350, 550 and 750. Other examples of polyether mono alkyl ethers are Guerbet alcohols which are reacted with ethylene oxide, including those having a weight average molecular weight from 250 to 750.

The hydroxy carboxylic acid from which A is derived is commonly a hydroxy-$C_{2-20}$-alkenylene carboxylic acid or a hydroxy-$C_{1-20}$-alkylene carboxylic acid. The alk(en)ylene group may be linear or branched. Examples of hydroxy carboxylic acids are ricinoleic acid, 12-hydroxy stearic acid, 6-hydroxy caproic acid, 5-hydroxy valeric acid, 12-hydroxy dodecanoic acid, 5-hydroxy dodecanoic acid, 5-hydroxy decanoic acid, 4-hydroxy decanoic acid, 10-hydroxy undedanoic acid, lactic acid and glycolic acid.

As noted hereinbefore, A may be derived from a lactone. Examples of suitable lactones are β-propiolactone, optional alkyl substituted ε-caprolactone and optionally alkyl substituted δ-valerolactone. The alkyl substituent in ε-caprolactone and δ-valerolactone in one embodiment includes a $C_{1-6}$-alkyl or $C_{1-4}$-alkyl and may be linear or branched. Examples of suitable lactones are ε-caprolactone and the 7-methyl-, 3-methyl-, 5-methyl-, 6-methyl-, 4-methyl-, 5-tertbutyl-, 4,4,6-trimethyl- and 4,6,6-trimethyl-analogues thereof.

Mixtures of hydroxy carboxylic acids and/or lactones may be used.

When A is derived from optionally substituted ε-caprolactone and one or more other lactone the ε-caprolactone in one embodiment is present in not less than 50%, not less than 70% or not less than 90% by weight of the total amount of lactone. In one embodiment, A is derived from ε-caprolactone itself.

The choice of R—COOH and the hydroxy carboxylic acid or lactone may vary over wide limits and depends on the nature of the particulate solid and the particulate organic medium. Where the organic medium is non-polar, the hydroxy carboxylic acid often contains not less than 8 carbon atoms excluding the carboxylic acid group. Useful dispersants for non-polar organic media are obtainable from 12-hydroxy dodecanoic acid, 5-hydroxy dodecanoic acid, 5-hydroxy decanoic acid, 4-hydroxy decanoic acid. In one embodiment, dispersants for non-polar organic media are obtainable from 12-hydroxy stearic acid or ricinoleic acid. In the case of non-polar organic media, these hydroxy carboxylic acids containing 8 or more carbon atoms may also be mixed with hydroxy carboxylic acids which contain up to 6 carbon atoms excluding the carboxylic acid group or a lactone thereof. In one embodiment, the amount of hydroxy carboxylic acid containing up to 6 carbon atoms in such mixtures is not greater than 50% or not greater than 30% based on the total amount of hydroxy carboxylic acid or lactone. Useful dispersants for non-polar media containing mixtures of hydroxy carboxylic acids are those where A is derivable from mixtures of 12-hydroxy stearic acid and ε-caprolactone and those derivable from mixtures of ricinoleic acid and ε-caprolactone.

Where the organic medium is polar or a resin composite, A in one embodiment is derivable from hydroxy carboxylic acids which contain up to 6 carbon atoms excluding the carboxylic acid group or lactone thereof. Thus, one important class of dispersants for polar organic media and resin composites is that where A is derivable from ε-caprolactone which may be in admixture with $C_{1-6}$-alkyl substituted ε-caprolactone, $C_{1-6}$-alkyl substituted δ-valerolactone or δ-valerolactone itself. In one embodiment, the amount of ε-caprolactone is not less than 50% or not less than 70% based on the total amount of hydroxy carboxylic acids or lactones.

In another embodiment, the class of dispersants, different polyester chains represented by T-V-(A)$_m$-U- may be attached to Z where one polyester chain is derivable from hydroxy carboxylic acids containing not less than 8 carbon atoms excluding the carboxylic acid group and a second polyester chain is derivable from hydroxy carboxylic acids which contain up to 6 carbon atoms excluding the carboxylic acid group or lactone thereof. Such dispersants offer greater utility in both polar and non-polar organic media but are less effective than those which are specifically designed for the individual organic media.

When U is a divalent bond, it includes the residue of an ethylenically unsaturated group when Z is a basic group or a moiety containing a basic group. In one embodiment, residues containing an ethylenically unsaturated group contain a hydroxy group and are derived from (meth)acrylic acid (applicant uses (xxxx) to indicate a substituent group is optionally present (in this case methyl on the beta carbon of the acryl)). Examples of compounds which contain an ethylenically unsaturated group and a hydroxy group are hydroxyethyl(meth)acrylate, hydroxy propyl(meth)acrylate, hydroxybutyl(meth)acrylate, polyethylene mono(meth)acrylate, polypropylene glycol mono(meth)acrylate, polyethylene glycol polytetramethylene glycol mono(meth)acrylate and polypropylene glycol polytetramethylene glycol mono (meth)acrylate (e.g. Blemmer P E, Blemmer P P from Nihon Yushi Co Ltd). In one embodiment, the ethylenically unsaturated group is derivable from hydroxyethyl(meth)acrylate.

A person skilled in the art will appreciate that it is also possible to make the dispersants from a TPOAC acid of formula 3, starting with an alcohol ROH and converting it to a carboxylic acid ended polymer by reaction with a dibasic acid or anhydride which may be subsequently reacted with an amine, polyamine or polyimine. Such dispersants are those of formula 1 wherein V or U are the residue of a dibasic acid or anhydride.

Examples of polyamines represented by Z are polyvinylamine and polyallylamine.

The polyimine in one embodiment is poly($C_{2-6}$-alkyleneimine) and or polyethylene imine (hereinafter PEI). The polyimine may be linear or branched. Linear polyethyleneimines may be prepared by hydrolysis of poly (N-acyl) alkyleneimines as described, for example, by Takeo Saegusa et al. in Macromolecules, 1972, Vol: 5, page 4470. The branched polyethyleneimines of differing molecular weights are commercially available from BASF and Nihon Shokubai. Polyallylamine and poly-(N-alkyl) allylamines of differing molecular weights are commercially available from Nitto Boseki. Polyvinylamine of differing molecular weights are available from Mitsubishi Kasai. Poly(propyleneimine) dendrimers are commercially available from DSM Fine Chemicals and poly (amidoamine) dendrimers are available as "Starburst" dendrimers from Aldrich Chemical Co.

The number average molecular weight of the polyamine or polyimine in one embodiment ranges from 500 to 600,000 or from 1,000 to 200,000 or from 1,000 to 100,000 or from 1200 to about 20,000 or 100,000.

In one embodiment, m is not greater than 1000 or not greater than 100, for instance, not greater than 50 or not greater than 20.

Where Q is the residue of urea, the number of free imino or amino groups in Z when reacted with urea can vary over wide limits up to the maximum available nitrogen atoms which do not carry a group T-V-$(A)_m$-U.

When Q is the residue of an oxide, any of the amino or imino groups in Z which do not carry the group T-V-$(A)_m$-U may be converted to a N-oxide by reaction with oxygen (including air) or a peroxide such as hydrogen peroxide or ammonium persulphate.

When T is the residue of an acid R—COOH and V is a direct bond, the dispersant in one embodiment is derivable from an acid of formula 2:

R—CO$(A)_m$-OH          Formula (2)

This is hereinafter referred to as a TPOAC acid.

The dispersants according to the invention typically have two or more chains of formula (3) attached to the polyamine or polyimine:

T-V-$(A)_m$-U          Formula (3)

wherein T, V, A, U and m are as defined hereinbefore.

Each of the chains represented by formula (3) may be linked to the polyamine or polyimine through either a covalent amide link —CON< formed between a terminating carbonyl group of the TPOAC acid and a primary or secondary nitrogen atom in the polyamine or polyimine or through an ionic linkage —COO$^-$HN$^+$=formed between a terminating —COOH group of the TPOAC acid and a positively charged nitrogen atom of a substituted ammonium group in the polyamine or polyimine. Because the dispersant contains two or more chains T-V-$(A)_m$-U, it may contain a mixture of amide and salt linkages depending on the reaction conditions used in its preparation.

The dispersant of the first aspect of the invention may be conveniently represented by formula (4):

Formula (4)

wherein,

X-*-*-X represents a polyamine or polyimine;

Y represents the chain T-V-$(A)_m$-U which may be the same or different and is linked via an amide and/or salt linkage; and r is from 2 to 2000; and T, A, B. and m are as defined hereinbefore.

In one embodiment, r is not less than 10. In another embodiment, r is not greater than 1000 or not greater than 500.

In one embodiment, the weight ratio of Y to X-*-*-X is from 30:1 to 1:1, or from 20:1 and 2:1.

In one embodiment, X-*-*-X represents poly($C_{2-4}$-alkylene imine) (PAI) or polyethylene imine (PEI).

The PAI in one embodiment has a number-average molecular weight from 500 to 600,000 or from 1,000 to 200,000 or from 1,000 to 100,000, for instance, from 1,200 to 70,000.

The dispersants of the first aspect of the invention are typically made by reacting a preformed TPOAC acid with polyallylamine, polyvinylamine or PAI at a temperature from 100 to 150° C., often in an inert atmosphere.

The TPOAC acid in one embodiment is prepared by reacting one or more of (a) a hydroxycarboxylic acid, (b) a lactone, (c) an amino carboxylic acid or (d) mixtures thereof. In one embodiment, the TPOAC acid is a mixture of 2 or more of (a)-(c).

The chains represented by Y may be the same or different.

The TPOAC acid in one embodiment is prepared at a temperature from 50 to 250° C., optionally in the presence of a carboxylic acid R—COOH and optionally in the presence of an esterification catalyst. In one embodiment, the temperature is not less than 100° C. or not less than 150° C. In order to minimize any charring of the final product, the temperature is generally not greater than 200° C. The inert atmosphere may be provided by any inert gas of the Periodic Table but is generally nitrogen.

The esterification catalyst may be any previously known to the art and include tetra-alkyl titanate, for example, tetrabutyltitanate, zinc salt of an organic acid, for example, zinc acetate, zirconium salt of an aliphatic alcohol, for example, zirconium isopropoxide, toluene sulphonic acid or a strong organic acid such as trifluoroacetic acid.

In another embodiment of the invention, there is provided a dispersant of formula (4) wherein U represents a chain residue of formula (5):

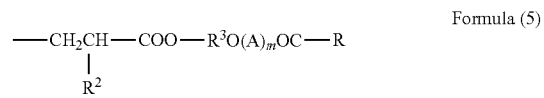

Formula (5)

wherein

A, R and m are as defined hereinbefore;

$R^2$ is hydrogen or $C_{1-4}$-alkyl; and $R^3$ is an aliphatic or aromatic residue containing up to 10 carbon atoms which optionally contains a polyether residue derivable from propylene oxide and/or ethylene oxide.

When $R^2$ is $C_{1-4}$-alkyl; and in one embodiment methyl. $R^3$ is $C_{2-6}$-alkylene; and in one embodiment $C_{2-4}$-alkylene.

The dispersants containing the chain residue of formula (6) may be conveniently prepared by the Michael addition reaction of an a polyamine or polyimine to a compound of formula (6):

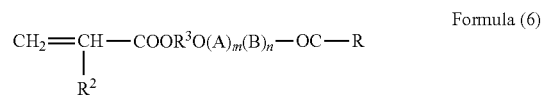

Formula (6)

wherein A, R, $R^2$, $R^3$ and m are as defined hereinbefore.

The compound of formula (6) may be conveniently prepared by reacting an (alk)acrylic acid derivative containing a hydroxy group with a preformed TPOAC acid of formula 2 at a temperature from 50° to 150° C., or from 80° to 120° C., in the presence of air or oxygen. In one embodiment, the reaction is carried out in the presence of an esterification catalyst such as a tetra-alkyl titanate, for example, tetra butyl titanate, a metal alkoxide such as tetraisopropyltitanate, a tin catalyst such as stannous chloride, stannous octylate or monobutyl tin oxide or an acid catalyst such as toluene sulphonic acid or trifluoroacetic acid. The reaction in one embodiment is carried out in the presence of a polymerisation inhibitor to inhibit the self-polymerisation of the compound of formula 8 or the (alk)acrylic acid derivative. Examples of polymerization inhibitors are (methyl)hydroquinone and phenothiazine. Oxygen also acts as a polymerisation inhibitor.

The reaction between the polyamine or polyimine and the compound of formula 7 may be carried out by heating between 10 and 130° C., or between 20 and 100° C.

The reaction between the compound of formula (5) and a polyamine or polyimine may optionally be carried out in the presence of a solvent which is inert to the reactants. Examples of suitable solvents are hydrocarbons such as toluene, xylene and solvesso, ketones such as acetone, methylethylketone and methylisobutylketone, alkanols such as n-butanol and isopropanol and esters such as butyl acetate, dimethyladipate, dimethyl succinate and dimethyl glutarate.

As disclosed hereinbefore, the free amino and/or imino groups in the dispersant are then reacted with an oxidizing agent or urea.

As noted hereinbefore, the dispersants are particularly useful for dispersing a particulate solid in an organic medium or a polar organic medium.

According to a further aspect of the invention, there is provided a composition comprising a particulate solid and a dispersant of Formula 1.

According to a still further aspect of the invention, there is provided a dispersion comprising a dispersant of Formula 1, a particulate solid and an organic medium.

The solid present in the dispersion may be any inorganic or organic solid material which is substantially insoluble in the organic medium at the temperature concerned and which it is desired to stabilize in a finely divided form therein.

Examples of suitable solids are pigments for solvent inks; pigments, extenders and fillers for paints and plastics materials; dyes, for instance, disperse dyes; optical brightening agents and textile auxiliaries for solvent dyebaths, inks and other solvent application systems; solids for oil-based and invert-emulsion drilling muds; dirt and solid particles in dry cleaning fluids; particulate ceramic materials; magnetic materials and magnetic recording media, fire retardants such as those used in plastics materials and biocides, agrochemicals and pharmaceuticals which are applied as dispersions in organic media.

In one embodiment, the solid is a pigment from any of the recognized classes of pigments described, for example, in the Third Edition of the Colour Index (1971) and subsequent revisions of, and supplements thereto, under the chapter headed "Pigments". Examples of inorganic pigments are titanium dioxide, zinc oxide, Prussian blue, cadmium sulphide, iron oxides, vermilion, ultramarine and the chrome pigments, including chromates, molybdates and mixed chromates and sulphates of lead, zinc, barium, calcium and mixtures and modifications thereof which are commercially available as greenish-yellow to red pigments under the names primrose, lemon, middle, orange, scarlet and red chromes. Examples of organic pigments are those from the azo, disazo, condensed azo, thioindigo, indanthrone, isoindanthrone, anthanthrone, anthraquinone, isodibenzanthrone, triphendioxazine, quinacridone and phthalocyanine series, for instance, copper phthalocyanine and its nuclear halogenated derivatives, and also lakes of acid, basic and mordant dyes. Carbon black, although strictly inorganic, behaves more like an organic pigment in its dispersing properties. In one embodiment, organic pigments are phthalocyanines, for instance, copper phthalocyanines, monoazos, disazos, indanthrones, anthranthrones, quinacridones and carbon blacks.

Other suitable solids include: extenders and fillers such as talc, kaolin, silica, barytes and chalk; particulate ceramic materials such as alumina, silica, zirconia, titania, silicon nitride, boron nitride, silicon carbide, boron carbide, mixed silicon-aluminium nitrides and metal titanates; particulate magnetic materials such as the magnetic oxides of transition metals, for instance, iron and chromium, e.g., gamma-$Fe_2O_3$, $Fe_3O_4$, and cobalt-doped iron oxides, calcium oxide, ferrites, such as, barium ferrites; and metal particles, such as, metallic iron, nickel, cobalt and alloys thereof; agrochemicals such as the fungicides flutriafen, carbendazim, chlorothalonil and mancozeb and fire retardants such as aluminium trihydrate and magnesium hydroxide.

The organic medium present in the dispersions of the invention in one embodiment is a polar organic medium or a substantially non-polar aromatic hydrocarbon or halogenated hydrocarbon. By the term "polar" in relation to the organic medium is meant an organic liquid or resin capable of forming moderate to strong bonds as described in the article entitled "A Three Dimensional Approach to Solubility" by Crowley et al in Journal of Paint Technology, Vol. 38, 1966, at page 269. Such organic media generally have a hydrogen bonding number of 5 or more as defined in the abovementioned article.

Examples of suitable polar organic liquids are amines, ethers, for example, lower alkyl ethers, organic acids, esters, ketones, glycols, alcohols and amides. Numerous specific examples of such moderately strongly hydrogen bonding liquids are given in the book entitled "Compatibility and Solubility" by Ibert Mellan (published in 1968 by Noyes Development Corporation) in Table 2.14 on pages 39-40 and these liquids all fall within the scope of the term polar organic liquid as used herein.

In one embodiment, the polar organic liquids are dialkyl ketones, alkyl esters of alkane carboxylic acids and alkanols, such as, such liquids containing up to, and including, a total of 6 carbon atoms. Suitable examples of organic liquids include dialkyl and cycloalkyl ketones, such as acetone, methyl ethyl ketone, diethyl ketone, di-isopropyl ketone, methyl isobutyl ketone, di-isobutyl ketone, methyl isoamyl ketone, methyl n-amyl ketone and cyclohexanone; alkyl esters such as methyl acetate, ethyl acetate, isopropyl acetate, butyl acetate, ethyl formate, methyl propionate, methoxy propylacetate and ethyl butyrate; glycols and glycol esters and ethers, such as ethylene glycol, 2-ethoxyethanol, 3-methoxypropylpropanol, 3-ethoxypropylpropanol, 2-butoxyethyl acetate, 3-methoxypropyl acetate, 3-ethoxypropyl acetate and 2-ethoxyethyl acetate; alkanols such as methanol, ethanol, n-propanol, isopropanol, n-butanol and isobutanol and dialkyl and cyclic ethers such as diethyl ether and tetrahydrofuran.

The substantially non-polar, organic liquids which may be used, either alone or in admixture with the aforementioned polar solvents, are aromatic hydrocarbons, such as toluene and xylene, aliphatic hydrocarbons such as hexane, heptane, octane, decane, petrolium distillates such as white spirit, mineral oils, vegetable oils and halogenated aliphatic and aromatic hydrocarbons, such as trichloro-ethylene, perchloroethylene and chlorobenzene.

Examples of suitable polar resins, as the medium for the dispersion form of the present invention, are film-forming resins such as are suitable for the preparation of inks, paints and chips for use in various applications such as paints and inks. Examples of such resins include polyamides, such as Versamid™ and Wolfamid™, and cellulose ethers, such as ethyl cellulose and ethyl hydroxyethyl cellulose. Examples of paint resins include short oil alkyd/melamine-formaldehyde, polyester/melamine-formaldehyde, thermosetting acrylic/melamine-formaldehyde, long oil alkyd and multi-media resins such as acrylic and urea/aldehyde.

The resin may also be an unsaturated polyester resin including the so-called sheet molding compounds and bulk molding compounds which may be formulated with reinforcing fibers and fillers. Such molding compounds are described in DE 3,643,007 and the monograph by P F Bruins entitled "Unsaturated Polyester Technology", Gordon and Breach Science publishers, 1976, pages 211 to 238.

If desired, the dispersions may contain other ingredients, for example, resins (where these do not already constitute the organic medium) binders, fluidizing agents (such as those described in GB-A-1508576 and GB-A-2108143), anti-sedimentation agents, plasticizers, leveling agents and preservatives.

The dispersions typically contain from 5 to 95% by weight of the solid, the precise quantity depending on the nature of the solid and the quantity depending on the nature of the solid and the relative densities of the solid and the organic medium. For example, a dispersion in which the solid is an organic material, such as an organic pigment, typically containing from 15 to 60% by weight of the solid whereas a dispersion in which the solid is an inorganic material, such as an inorganic pigment, filler or extender, typically containing from 40 to 90% by weight of the solid based on the total weight of dispersion.

The dispersion may be obtained by any of the conventional methods known for preparing dispersions. Thus, the solid, the organic medium and the dispersant may be mixed in any order, the mixture then being subjected to a mechanical treatment to reduce the particles of the solid to an appropriate size, for example, by ball milling, bead milling, gravel milling or plastic milling until the dispersion is formed. Alternatively, the solid may be treated to reduce its particle size independently or in admixture with either the organic medium or the dispersant, the other ingredient or ingredients then being added and the mixture being agitated to provide the dispersion.

If the composition is required in dry form, the liquid medium may be volatile so that it may be readily removed from the particulate solid by a simple separation means such as evaporation. In one embodiment, the dispersion comprises the liquid medium.

If the dry composition consists essentially of the dispersant and the particulate solid, in one embodiment it contains at least 0.2%, or at least 0.5% or at least 1.0% dispersant based on weight of the particulate solid. In one embodiment, the dry composition contains not greater than 100% or not greater than 50% or not greater than 20% or not greater than 10% by weight based on the weight of the particulate solid.

As described hereinbefore, the dispersants of the invention are particularly suitable for preparing mill-bases where the particulate solid is milled in a liquid medium in the presence of both a particulate solid and a film-forming resin binder.

Thus, according to a still further aspect of the invention, there is provided a mill-base comprising a particulate solid, dispersant and a film-forming resin.

Typically, the mill-base contains from 20 to 70% by weight particulate solid based on the total weight of the mill-base. In one embodiment, the particulate solid is not less than 30 or not less than 50% by weight of the mill-base.

EXAMPLES

Example 1

The amount of resin in the mill-base may vary over wide limits but generally is not less than 10%, or not less than 20% by weight of the continuous/liquid phase of the mill-base. In one embodiment, the amount of resin is not greater than 50% or not greater than 40% by weight of the continuous/liquid phase of the mill-base.

Stearic acid (9.2 parts, 32 mmols ex Aldrich) and ε-caprolactone (51.1 parts, 448 mmols ex Aldrich) are stirred under nitrogen at 120° C. Tetrabutyltitanate (0.3 parts) is then added and the reaction is continued by stirring for 16 hours at 200° C. The temperature is then lowered to 120° C. and polyethylene imine (7.5 parts, SP 200, MW 10,000 ex Nippon Shokubai) is added and the reactants are stirred under nitrogen at 120° C. for 6 hours. After cooling to 200° C., the product is obtained as a hard, waxy solid. This is Dispersant A. The base equivalent is 1675.

Dispersant A (56 parts) is dissolved in toluene (57.45 parts) at 80° C. to give a clear solution. Urea (1.45 parts) is added and the reactants are stirred under nitrogen at 120° C. for 18 hours. The solvent is removed by evaporation and after cooling to 20° C. the product is obtained as a beige solid (56 parts). This is Dispersant 1. The base equivalent is 2210.

Example 2

Caproic acid (10 parts, 86 mmols ex Aldrich) and ε-caprolactone (112 parts, 981 mmols ex Aldrich) are stirred under nitrogen at 120° C. Tetrabutyltitanate (0.5 parts) is then added and the reaction is continued by stirring for 18 hours at 200° C. The temperature is then lowered to 120° C. and polyethylene imine (12 parts, SP 050, MW 5,000 ex Nippon Shokubai) is added and the reactants are stirred under nitrogen at 120° C. for 8 hours. After cooling to 200° C., the product is obtained as a hard, waxy solid. This is Dispersant B. The base equivalent is 1557.

Dispersant B (50 parts) is dissolved in toluene (57.45 parts) at 80° C. to give a clear solution. Urea (1.6 parts) is added and the reactants are stirred under nitrogen at 120° C. for 18 hours. The solvent is removed by evaporation and after cooling to 20° C. the product is obtained as a beige solid (56 parts). This is Dispersant 2. The base equivalent is 2730.

Example 3

Ricinoleic acid (300 parts, ex Fluka) and zirconium butylate (1 part) are stirred at 200° C. until an acid value of 50 mg KOH/g is reached corresponding to a MW of 1120. Then, the temperature of the mixture is lowered to 120° C. and polyethylene imine (28.5 parts, SP 200, MW 10,000 ex Nippon Shokubai) is added and the reactants are stirred under nitrogen at 120° C. for 6 hours. After cooling to room temperature, the product is obtained as a golden liquid. This is Dispersant C. The base equivalent is 2136.

Dispersant C (40 parts) and urea (1.31 parts ex Fisher) are stirred together at 80° C. under a nitrogen atmosphere for 18 hours. A brown, viscous liquid (40 parts) is obtained. This is Dispersant 3. The base equivalent is 3839.

Example 4

Ricinoleic acid (100 parts, ex Fluka), 12-hydroxystearic acid (100.67 parts) and zirconium butylate (1 part) are stirred at 200° C. until an acid value of 35 mg KOH/g is reached corresponding to a MW of 1600. Then, the temperature of the mixture is lowered to 120° C. and polyethylene imine (13.5 parts, SP 200, MW 10,000 ex Nippon Shokubai) is added and the reactants are stirred under nitrogen at 120° C. for 6 hours. After cooling to 20° C., the product is obtained as a golden liquid. This is Dispersant D. The base equivalent is 1376.

Dispersant D (40 parts) and 35 wt % of aqueous hydrogen peroxide solution (1.06 parts ex Fisher) is stirred together at 80° C. under a nitrogen atmosphere until the peroxide has substantially reacted as confirmed by a negative result using starch iodide paper. A brown, viscous liquid (40 parts) is obtained. This is Dispersant 4. The base equivalent is 1845.

Example 5

Lauric acid (10 parts, 49 mmols ex Aldrich), ε-caprolactone (44.7 parts, 392 mmols ex Aldrich) and 7-methylcaprolactone (25 parts, 196 mmols) are stirred under nitrogen at 120° C. Zirconium isopropoxide (0.45 parts) is then added and the reaction is continued by stirring for 6 hours at 200° C. The temperature is then lowered to 120° C. and polyethylene imine (5.5 parts, SP 200, MW 10,000 ex Nippon Shokubai) is added and the reactants are stirred under nitrogen at 120° C. for 6 hours. After cooling to 20° C., the product is obtained as a pale brown liquid. This is Dispersant E. The base equivalent is 1407.

Dispersant E (40 parts) and 35 wt % of aqueous hydrogen peroxide solution (1.1 parts ex Fisher) is stirred together at 80° C. under a nitrogen atmosphere until the peroxide has substantially reacted as confirmed by a negative result using starch iodide paper. A brown, viscous liquid (40 parts) is obtained. This is Dispersant 5. The base equivalent is 1801.

Example 6

Isocarb 16 (7 parts, 27 mmols ex Sasol), ε-caprolactone (27.7 parts, 243 mmols ex Aldrich) and 7-methylcaprolactone (10.4 parts 81 mmols) are stirred under nitrogen at 120° C. Zirconium butylate (0.3 parts) is then added and the reaction is continued by stirring for 6 hours at 200° C. The temperature is then lowered to 120° C. and polyethylene imine (6.4 parts, SP 030, MW 3,000 ex Nippon Shokubai) is added and the reactants are stirred under nitrogen at 120° C. for 6 hours. After cooling to 20° C., the product is obtained as a pale brown liquid. This is Dispersant F. The base equivalent is 833.

Dispersant F (40 parts) and 35 wt % of aqueous hydrogen peroxide solution (4.5 parts ex Fisher) is stirred together at 80° C. under a nitrogen atmosphere until the peroxide has substantially reacted as confirmed by a negative result using starch iodide paper. A brown, viscous liquid (41 parts) is obtained. This is Dispersant 6. The base equivalent is 1228.

Example 7

Isocarb 16 (7 parts, 27 mmols ex Sasol), ε-caprolactone (27.7 parts, 243 mmols ex Aldrich) and 7-methylcaprolactone (10.4 parts 81 mmols) are stirred under nitrogen at 120° C. Zirconium butylate (0.3 parts) is then added and the reaction is continued by stirring for 6 hours at 200° C. This is Intermediate 1.

Ricinoleic acid (35 parts, ex Fluka), s-caprolactone (18.7 parts ex Aldrich), Isocarb 12 (9.4 parts ex Sasol) and zirconium butylate (0.3 part) are stirred at 200° C. until an acid value of 30 mg KOH/g is reached corresponding to a MW of 1820. This is Intermediate 2.

Intermediate 1 (18 parts) and Intermediate 2 (6 parts) are stirred at 120° C. and polyethylene imine (2 parts, SP 200, MW 10,000 ex Nippon Shokubai) is added and the reactants are stirred under nitrogen at 120° C. for 6 hours. After cooling to 20° C., the product is obtained as a pale brown liquid. This is Dispersant G. The base equivalent is 1312.

Dispersant G (24 parts) and 35 wt % of aqueous hydrogen peroxide solution (2.5 parts ex Fisher) are stirred together at 80° C. under a nitrogen atmosphere until the peroxide has substantially reacted as confirmed by a negative result using starch iodide paper. A brown, viscous liquid (41 parts) is obtained. This is Dispersant 7. The base equivalent is 2217.

Example 8

Lauric acid (5 parts), ∂-valerolactone (7.5 parts) and ε-caprolactone (34.2 parts) are stirred under nitrogen at 120° C. Zirconium butylate (0.3 parts) is then added and the reaction is continued by stirring for 8 hours at 200° C. The temperature is then lowered to 120° C. and polyethylene imine (3.6 parts, SP 200, MW 10,000 ex Nippon Shokubai) is added and the reactants are stirred under nitrogen at 120° C. for 6 hours. After cooling to 200° C., the product is obtained as a soft, waxy solid. This is Dispersant H. The base equivalent is 1710.

Dispersant H (49 parts) is dissolved in toluene (50.5 parts) at 80° C. to give a clear solution. Urea (1.5 parts) is added and the reactants are stirred under nitrogen at 120° C. for 18 hours. The solvent is removed by evaporation and after cooling to 20° C. the product is obtained as a beige solid (56 parts). This is Dispersant 8. The base equivalent is 2872.

Example 9

Lauric acid (10 parts), ∂-valerolactone (5 parts) and ε-caprolactone (22.8 parts) are stirred under nitrogen at 120° C. Zirconium butylate (0.3 parts) is then added and the reaction is continued by stirring for 8 hours at 200° C. The temperature is then lowered to 120° C. and polyethylene imine (5.4 parts, SP 018, MW 1,800 ex Nippon Shokubai) is added and the reactants are stirred under nitrogen at 120° C. for 6 hours. After cooling to 200° C. the product is obtained as a soft, waxy solid. This is Dispersant I. The base equivalent is 1128.

Dispersant I (40 parts) and urea (2 parts) are stirred together under nitrogen at 120° C. for 18 hours. The product is obtained as an amber viscous liquid (40 parts). This is Dispersant 9. The base equivalent is 1503.

Isocarb™16 (25 parts, 97 mmols, ex Sasol) and thionyl chloride (13.9 parts, 117 mmols) are stirred in toluene (30 ml) at 125 C for 8 hours and then the solvent and excess thionyl chloride are removed under reduced pressure to give a brown liquid of Isocarb™16 acid chloride (24.5 parts). The IR shows acid chloride carbonyl peak at 1794 $cm^{-1}$. Isocarb™16 acid chloride (10.7 parts, 38.8 mmols), s-caprolactone (13.3 parts, 116 mmols, ex Aldrich) and 12-hydroxystearic acid (35 parts, 116 mmols) are stirred under nitrogen at 150° C. Zirconium butylate (0.3 parts) is then added and the reaction is continued by stirring for 24 hours at 185° C. The temperature is then lowered to 120° C., 40 parts of the mixture and polyethyleneimine (4 parts, SP 075, MW 7,500 ex Nippon Shokubai) is stirred under nitrogen at 120° C. for 6 hours. After cooling to 20° C., the product is obtained as a brown viscous liquid. This is Dispersant J. Base Equivalent is 1133.

Dispersant J (33 parts) is dissolved in toluene (50 parts) at 80° C. to give a clear solution. Urea (0.96 parts) is added and the reactants are stirred under nitrogen at 120° C. for 18 hours. The solvent is removed by evaporation and after cooling to 20° C. the product is obtained as a beige solid (56 parts). This is Dispersant 10. Base equivalent is 1599.

Milling Test

The dispersant (0.45 parts) is dissolved in solvent (7.55 parts) by warming, as necessary. After cooling to 25° C., 3 mm diameter glass beads (16 parts) and red pigment (2 parts, Monolite Rubine 3B ex Avecia) is added. The pigment is milled by shaking on a horizontal shaker for 16 hours. The viscosity of the resulting dispersion is assessed using an arbitrary scale of A to E (good to poor). The results are given in Table 1 below which clearly illustrates that the urea dispersant, Dispersant 1, produces superior dispersions in both polar and non-polar solvents compared with the dispersant prior to reaction with urea, Dispersant A.

TABLE 1

| | | Viscosity | |
|---|---|---|---|
| Example | Toluene | MPA/Bu (4:1) | MPA/Bu (1:4) |
| 1 | A | A/B | C |
| 2 | A/B | B/C | E |
| 5 | C | C/D | C/D |
| A | C | C/D | E |

Milling Formulation and Method for Monastral Blue BG

Pigment is Monastral Blue BG (ex Heubach, Pigment Blue 15.1), the millbase is 30% pigment and 12.6% agent on weight of pigment, Solsperse 5000 is a synergist (fluidising agent) available from Noveon Specialty Additives. Evaluation of the millbase is similar to that described above. The results obtained using Monastral Blue BG is shown in Table 2.

TABLE 2

| Dispersant | Toluene |
|---|---|
| 1 | A/B |
| 2 | A |
| 3 | A |
| 4 | B |
| 5 | B |
| 6 | B |
| 7 | A/B |
| 8 | B |
| 9 | C |
| 10 | A |
| B | B |
| E | B |
| F | B/C |

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined. Similarly, the ranges and amounts for each element of the invention may be used together with ranges or amounts for any of the other elements. As used herein, the expression "consisting essentially of" permits the inclusion of substances that do not materially affect the basic and novel characteristics of the composition under consideration.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A polyester amine dispersant of formula (1):

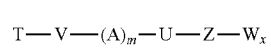

Formula (1)

wherein,

T-V-$(A)_m$-U- is a polyester chain

T is a polyester polymerisation terminating group containing R—C(=O)— or R—O— where R is a $C_1$ to $C_{20}$ hydrocarbyl group and T is derived from an ester forming reaction of a carboxylic acid or an alcohol;

V is a direct bond connecting T to $(A)_m$;

A is an oxyalkylenecarbonyl unit derived from one or more different hydroxyl-$C_{2-20}$-alkenylene carboxylic acids or hydroxyl-$C_{1-20}$-alkylene carboxylic acid or lactones thereof forming a polyester segment $(A)_m$;

U is a direct bond or a divalent linkage of the structure —$CH_2$—$CH(R^2)$—C(=O)—O—$R^3$—O— wherein $R^2$ is hydrogen or methyl and $R^3$ is ethyl and being the residue of hydroxyethyl(meth)acrylate linking Z to $(A)_m$;

Z is polyvinylamine, polyallylamine or a poly($C_{2-4}$-alkyleneimine) of number average molecular weight of 1,000 to 100,0000 g/mole that has been linked to $(A)_m$ via U;

W is the reaction product of an amino or imino group of Z with a) urea at 100 to 150° C. or b) oxygen to form an N-oxide;

m is from 2 to 2000; and x is from 1 up to the maximum number of available amino and/or imino groups in Z which do not carry the group T-V-$(A)_m$-U-.

2. A dispersant as claimed in claim 1 wherein T is derived from an ester forming reaction of a carboxylic acid R—COOH with $(A)_m$.

3. A dispersant as claimed in claim 2 wherein R is an alkyl which may be linear or branched.

4. A dispersant as claimed in claim 1 wherein A comprises an oxyalkylenecarbonyl repeat unit derived from 12-hydroxy stearic acid or ricinoleic acid reacted in a polyester polymerization.

5. A dispersant as claimed in claim 1 wherein the oxyalkylenecarbonyl repeat unit of (A), comprises the reaction product of ester polymerization of ε-caprolactone.

6. A dispersant as claimed in claim 1 wherein m is not greater than 20.

7. A dispersant as claimed in claim 1 wherein Z comprises polyvinylamine, polyallylamine or a poly($C_{2-4}$-alkyleneimine) carrying at least two chains of formula (3):

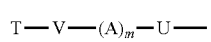

Formula (3)

wherein, T, V, A, U and m are as defined in claim 1.

8. A dispersant as claimed in claim 7 wherein the dispersant is represented by formula (4):

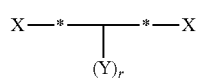

Formula (4)

wherein,
X-*-*-X represents polyvinylamine, polyallylamine or poly($C_{2-4}$-alkyleneimine);
each Y represents the polyester chain T-V-$(A)_m$-U which may be the same or different and is linked to X-*-*-X via an amide and/or salt linkage;
r is from 2 to 2000; and
T, V, A, U and m are as defined in claim 1.

9. A dispersant as claimed in claim 8 wherein the weight ratio of X-*-*-X to Y is from 20:1 to 2:1.

10. A dispersant as claimed in claim 8 wherein Y represents a chain residue of formula (5):

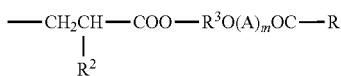

Formula (5)

wherein,
$R^2$ is hydrogen or $C_{1-4}$-alkyl; and
$R^3$ is an aliphatic or aromatic residue containing up to 10 carbon atoms which optionally contains a polyether derived from propylene oxide and/or ethylene oxide.

11. A process for making a dispersant of formula 1 of claim 1 comprising reacting T-V-$(A)_m$-U- with Z and then reacting imino or amino groups of Z, which do not carry the group T-V-$(A)_m$-U-, with urea at a temperature from 100° C. to 150° C.

12. A composition comprising a particulate solid and a dispersant as claimed in claim 1.

13. A composition as claimed in claim 12 which further comprises an organic liquid.

14. A millbase, paint or ink which comprises a particulate solid, organic liquid, film-forming binder resin and a dispersant as claimed in claim 1.

* * * * *